INVENTORS
JOHN L. FRAREY
CLARENCE J. ZABRISKIE
BY

THEIR ATTORNEY

United States Patent Office 3,315,522
Patented Apr. 25, 1967

3,315,522
ACOUSTICAL ANALYSER FOR INDICATING COMPONENT MALFUNCTION OF HIGH-SPEED ENGINES AND THE LIKE
John L. Frarey, Saddle River, and Clarence J. Zabriskie, Mahwah, N.J., assignors to Curtiss-Wright Corporation, a corporation of Delaware
Continuation of application Ser. No. 443,755, Mar. 10, 1965, which is a continuation of application Ser. No. 227,483, Oct. 1, 1962. This application Jan. 21, 1966, Ser. No. 523,843
10 Claims. (Cl. 73—116)

This is a continuation of application Ser. No. 443,755, filed Mar. 10, 1965, now abandoned, which in turn was a continuation of original application 277,483, filed Oct. 1, 1962, now abandoned.

This invention relates to acoustical analysers, in particular to analysers responsive to acoustical pick-up for indicating the operative condition and/or performance in whole or in part of a machine such as a high-speed engine having rotating and/or pulsating components. The invention is especially useful in non-contact application to turbo-jet engines having high-speed compressor and turbine stages, together with gear boxes, fuel and oil pumps and like accessories essential to basic engine operation.

Detecting and precisely locating jet engine malfunction, as well as abnormal conditions leading to or preceding actual malfunction or breakdown of basic engine components has long been a major problem for maintenance personnel. Where malfunction is believed to exist, the engine, as to the part or component in question, is generally "taken down" and inspected. If the assumption is incorrect, unnecessary "down time" on the engine results. Even where the engine is down for inspection, the cause of an actual or incipient malfunction may not at once be apparent since it may appear only under dynamic conditions, i.e., during high-speed operation, examples being main bearing and gear-teeth wear, and the like. In such cases, the maintenance personnel sometimes rely on personal experience in attempting to diagnose the trouble by ear. This problem is distinctly different from the detection of a resonance or "critical speed" condition that may unpredictably occur at some engine speed in the operating range. In that case, the principal purpose is to detect and then avoid where possible, operation of the engine at or near the resonance speed. Where the condition is severe, basic redesign may be necessary.

It is also necessary during engine test and checking for the maintenance personnel to determine readily the speed or r.p.m. of a given component, as well as the engine thrust. Conventional r.p.m. read-out and tracking methods generally require a direct electrical or mechanical connection between the engine under test and a tachometer or the like for supplying a test signal. This may in some cases be inconvenient and time consuming as where the nacelle-enclosed engine is mounted on the aircraft. Thrust read-out has been more complicated and may involve test-block equipment including probes, calculations from performance data, etc.

In accordance with the present invention acoustical pick-up devices, such as sensitive non-directional microphones, may be used. These are placed adjacent to the engine region or component in question and spaced from the engine to avoid direct physical contact therewith. This is an essential feature of the invention. The device or devices may be located adjacent a group of components of the engine to be analysed, and the resulting localized signals of varying frequencies and amplitudes are fed to electronic equipment for processing and selectively representing, as by display or suitable indication, pertinent performance data. The aforesaid non-contact technique enables maintenance personnel to place a microphone (hereinafter called "mike") near an operating engine at each desired stage or location, either when on test block or installed in the aircraft and thereby obtain directly precise performance data including malfunction information on a selected component, r.p.m. and thrust. In such tests or inspections the engine nacelle may be left in place, thereby greatly facilitating the handling and speed of testing.

A principal object of the invention therefore is an improved basically different high-speed engine analyser system that has no physical contact with the engine, that is in readiness for operation after a brief set-up time, and that utilizes localized radiated acoustical energy signals exclusively from the engine including its components for data analysis, engine speed tracking and, for direct read-out, display or other suitable representation of performance data.

The invention will be more fully set forth in the following description referring to the accompanying drawings, and the features of novelty will be pointed out with particularity in the claims annexed to and forming a part of this specification.

The nature of the various acoustical signals that are picked up for use in the analyser of this invention will first be briefly considered. A turbo-jet engine for example emits sound of two different characteristics. Rotating components emit sound where the frequency and amplitude are relatively stable and may be predicted or repeated. These are termed discrete signals. The action of fuel burning and the interaction of the high velocity exhaust streams with stationary air produces sound or noise which is termed random. A random signal is an extremely complex one; it contains all frequency components in the sound spectrum and each frequency component may have practically any amplitude and phase at a given instant of time.

Random noise may only be described in statistical terms. The amplitude of a frequency component of the signal, which is characteristic of a rotating element, will be the sum of the fixed amplitude obtained from the rotating element and the random signal at that frequency. Any discrete frequency analysed will therefore have a randomly varying amplitude; however, the time average will be equal to the fixed amplitude of the discrete frequency.

The noise produced by a gear train is a function of shaft speed and number of gear teeth. In a well operating gear train, the amplitude of this signal is very low. As the gear train deteriorates, the signal amplitude increases. The fundamental frequency is calculated from the following relationship:

$$f_g = \frac{\text{r.p.m.}_g}{60} N_t$$

where $f_g$=fundamental gear frequency emitted
$\text{R.p.m.}_g$=r.p.m. of gear
$N_t$=number of gear teeth The product of r.p.m. and number of teeth for any gear in a given train remains constant. Hence, for predicting characteristic gear train frequencies the relationship is conveniently calculated from the driving gear.

The fundamental frequency obtained from a compressor or turbine stage is due to the impulse given the air each time a blade passes a given location. The frequency here is given by:

$$f_b = \frac{\text{r.p.m.}_e}{60} N_b$$

where r.p.m.$_e$=engine r.p.m.
$N_b$=number of blades on wheel
$f_b$=expected stage frequency If any blade or blades are damaged, the train of impulses will not be of uniform amplitude and new frequencies will be introduced. These new frequencies are given by:

$$(f_{sb})_n = f_b \pm n f_s$$

where $f_s$=shaft frequency=r.p.m.$_e$/60
$f_b$=fundamental blade frequency
$n$=integer
$(f_{sb})_n$=$n$th order side band frequency The term "side band frequency" is used because of the similarity of the problem to amplitude modulation and the presence of these side band frequencies indicates damaged blades.

The signal obtained from a deteriorating bearing may contain any one of or all of several fundamental frequencies. These frequencies are produced by such action as the impact of a bad ball or roller against both inner and outer race, the impact of all balls against a bad spot on either race, other bearing faults, as well as combinations and harmonics of these frequencies.

Considering now the over-all engine power performance, there is a relationship between thrust and sound pressure level in a turbo-jet engine. The sound pressure level produced by a jet engine is primarily a function of the exhaust gas velocity. A thrust-sound pressure level relationship which has been found to exhibit good repeatability for a given engine type is basically determined by actual thrust measurement on the engine. As thrust can be affected by serious malfunction of a major component, such as a compressor stage, thrust measurement may in such instances be a confirming factor.

The expected characteristic frequencies for a given rotating element are confirmed and established for comparative purposes by actual test on a normally functioning engine running at a predetermined or reference r.p.m. These characteristic frequencies for the respective elements have been found to fall within definite spectral bands.

Referring now to the drawings.

Figure 1:
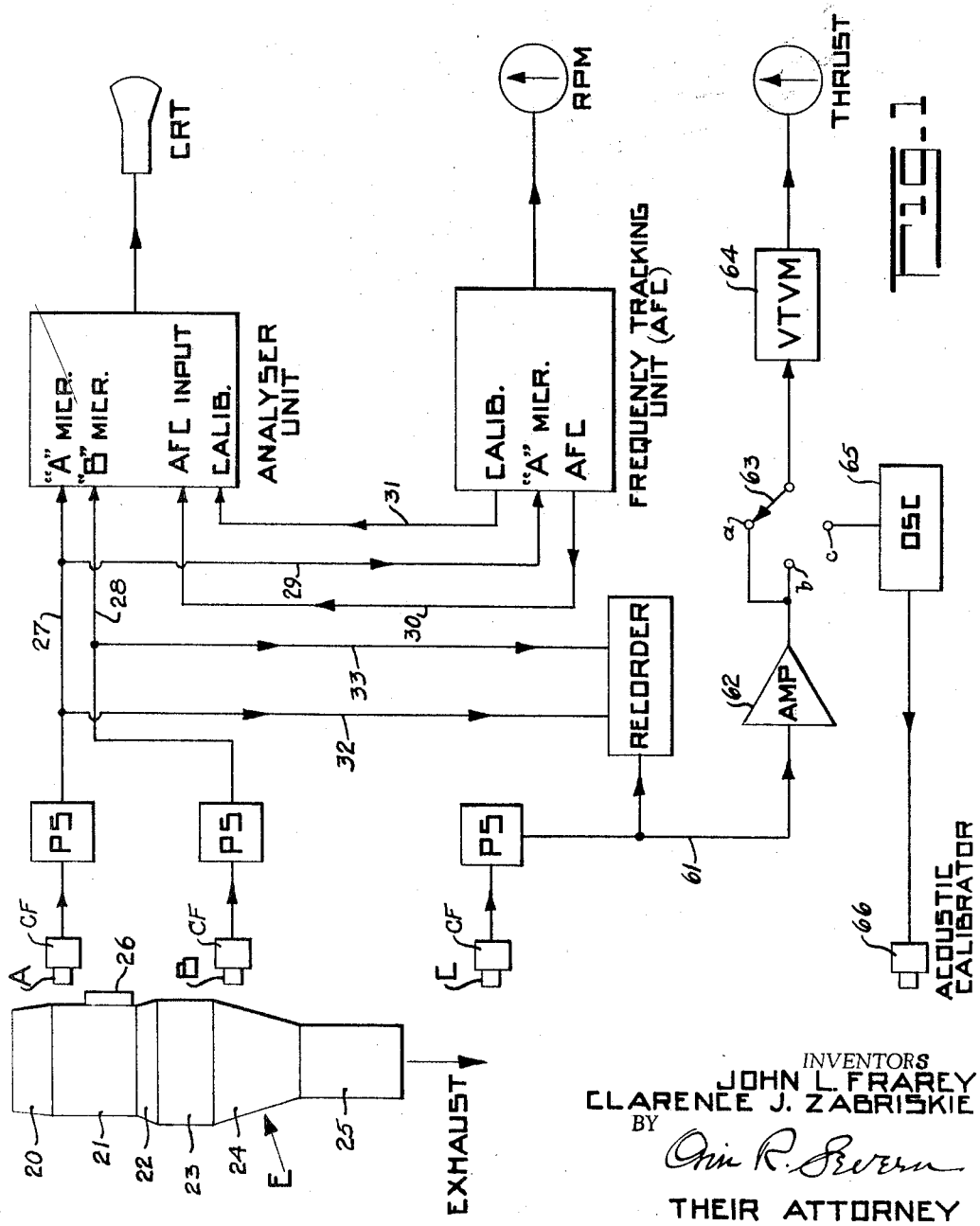
FIG. 1 is a block diagram generally illustrating application of the invention to a turbo-jet engine.

In FIG. 1, a conventional turbo-jet engine E is represented having as essential parts a front main bearing section 20, compressor stage section 21, center main bearing section 22, burner section 23, turbine stage section 24 (including rear main bearing), exhaust section 25 and accessory section 26 including gear trains, etc. The sensitive mikes A and B which are responsive to radiated acoustical energy from the engine are located apart from and in non-contact spaced relation with respect to the engine near selected regions that include two or more basic or vital elements of the engine. For example, the mike A is shown adjacent to the group including the front main bearing, first stages of the compressor and accessories, and mike B is adjacent to the group including the center main bearing, turbine stages and rear main bearing. Accordingly, each mike picks up acoustical energy radiated from the adjacent region of the engine, this energy representing the combined sound frequencies both discrete and random, of all the important rotating elements in that region.

In the test set-up shown, the signals from the mikes A and B representing analyser input data are fed selectively, as the case may be, to the analyser circuitry. The mike A signals, which in the present instance contain both the selected discrete signal and the preferred r.p.m. tracking signal, are used in the assumed test. As more clearly shown in FIG. 2, the mike A signals are fed to both the data analyser circuitry and also by a separate branch connection to the "frequency tracking unit." Accordingly, the mike A signals, which include all the necessary discrete data required here, including the r.p.m. tracking signal that is used for adjustment of the discrete signal to the reference speed.

A third mike C is located laterally of and to the rear of the engine exhaust at a suitable point (depending on the engine under test) for picking up signals representing the engine exhaust sound level. These signals are fed to a thrust indicating system also hereinafter described having a calibrated thrust meter as shown in FIG. 1.

Returning to the engine element analysing system, FIG. 1, the output of each mike A and B can be connected by leads 27 and 28 to the "analyzer unit" through conventional cathode-follower and power supply circuitry indicated generally at CF and PS, respectively. The A mike signals are also fed by lead 29 to the "frequency tracking unit" having automatic frequency control (AFC) and calibration circuitry. The selected output of the "analyser unit," FIG. 2, controls suitable indication or display means, such as a cathode ray tube "CRT." The selected engine element signals are individually displayed on the CRT scope.

The output of the "frequency tracking unit" (hereinafter for brevity termed AFC) also controls a suitable zero-centered meter "r.p.m.," that is conveniently calibrated for deviation with respect to a certain reference r.p.m. In the present instance, the reference r.p.m. is conveniently established as 47% of maximum engine r.p.m., which is "idle r.p.m." for a well-known jet engine. Deviation of r.p.m. from this reference is detected and a frequency correction signal introduced to compensate for r.p.m. deviation by keeping the displayed signals centered on the scope.

The AFC unit produces AFC and calibration signals that are fed by leads 30 and 31, respectively, to the data analyser.

For purposes of storage and/or recording, the A and B mike signals may also be fed by leads 32 and 33, respectively, directly to suitable apparatus, herein designated "recorder."

Figure 2:
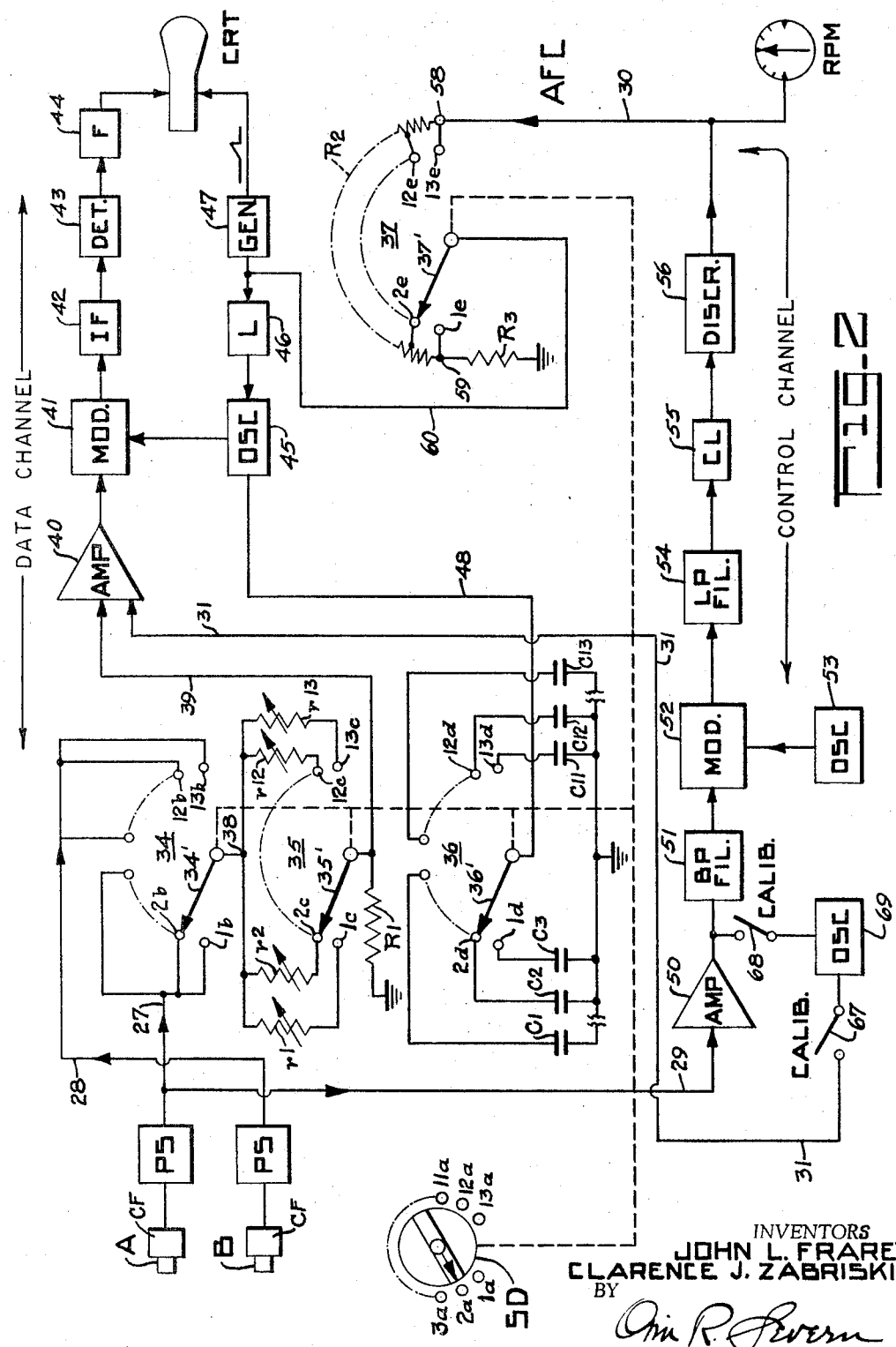
FIG. 2 is a more detailed block diagram illustrating the circuitry arrangement of the analyser unit and the frequency tracking unit of FIG. 1, including selector switching for respective band signals.

Referring specifically to FIG. 2, a selector dial SD having index positions 1$a$, 2$a$ 3$a$, etc., set by the test engineer, is coupled by suitable mechanical means as indicated by dotted lines for gang-operation of the slider contacts of a plurality of selector switches 34, 35, 36 and 37. The signals of mikes A and B (hereinafter called "A" and "B" signals) are fed respectively to separate sets of contacts 1$b$, 2$b$, etc., and 13$b$ and 12$b$, etc., of the selector 34. Each contact represents as presently described an individual testing position.

The switch slider contact 34' connects at 38 the A or B signals as the case may be to one of a plurality of parallel-connected selectively energized variable resistances, $r_1$, $r_2$, etc., and $r_{13}$, $r_{12}$, etc., which in turn are connected to corresponding contacts 1c, 2c, etc., and 13c, 12c, etc., for selective engagement by the slider 35' of the selector switch 35.

The switch slider 35' in turn is connected to a voltage divider comprising the grounded resistance $R_1$, and through the lead 39 to the input of the analyser amplifier 40. Thus, the A signal, for example, can be attenuated as required for display purposes according to the characteristic level of the selected discrete signal, and connected to the variable gain amplifier 40 through a selected channel of the series-connected gang-operated switches 34 and 35.

The gain of the amplifier 40 is adjusted to accommodate the weakest discrete signal under consideration, and the attenuating resistances $r_1$, $r_2$, etc., are adjusted accordingly.

At this point, a brief recitation of the various engine tests represented by the index positions of the selector dial SD will supplement subsequent description of the processing of the corresponding A and B signals. For present purposes, the following 13 positions are indicated, although it will be understood that any practical number of tests, depending on the nature of the machine or engine under test, can be accommodated by the invention.

| Dial position: | Engine element |
|---|---|
| 1 | Engine fundamental. |
| 2 | Center Main bearing (1st fundamental). |
| 3 | Aft train accessory gear box. |
| 4 | Forward train accessory gear box, bevel gear box. |
| 5 | 1st stage compressor. |
| 6 | 2nd stage compressor. |
| 7 | 3rd stage compressor. |
| 8 | Center main bearing (2nd fundamental). |
| 9 | 4th and 5th stage compressor. |
| 10 | 6th and 7th stage compressor. |
| 11 | 2nd stage turbine. |
| 12 | 8th–13th stage compressor. |
| 13 | 1st stage turbine. |

The so-called "center frequency," i.e., c.p.s. at the reference r.p.m., is various rotating for different elements and by way of example may range, starting at the lower end from 160 c.p.s. and 950 c.p.s. for the "engine fundamental" and center main bearing, respectively, to much higher frequencies, such as 5852 c.p.s. for the later stage compressor and 7152 c.p.s. for the first stage turbine. Each center frequency (discrete signal) is detected by narrow band analyser means operating on the heterodyne principle.

Referring again to the analyser circuitry, FIG. 2, the output signal of the data amplifier 40 is fed to a heterodyne wave analyser including a balanced modulator or "mixer" 41, a 100 kc. intermediate frequency (IF) filter 42, detertcor 43 and a "smoothing" output filter 44. This part of the analyser circuitry is for convenience termed "Data Channel." The control or tracking circuitry connected to the data channel may similarly be termed "Control Channel."

The output signal from the control channel to the data channel is from a local voltage-controlled oscillator (VCO) 45 of the grounded plate, Hartley type which provides a variable beat frequency signal for the balanced modulator that is mixed with the data input signal. Appropriate control capacitances ($C_1$, $C_2$, etc.) are selectively connected from the contacts 1d, 2d, etc., and slider 36' of selector switch 36 through lead 48 to the oscillator. This variable capacitance network, connected in well-known manner (shunt capacitance) to the oscillator, is adjusted through the selector dial SD for varying the frequency of the oscillator in relation to the center frequency of the discrete signal of the element selected for test. For better understanding of the oscillator operation, it will be assumed for the moment that only the capacitance shunt network above is connected thereto, that the engine is running at reference r.p.m., and that the selector dial SD is set for test of, say, the front main bearing having a characteristic signal of frequency $f_1$ (2031 c.p.s.). The adjusted oscillator output, which constitutes the second input for the balanced modulator, is mixed with the data input spectrum signals which include, among others, the selected discrete signal of frequency $f_1$. According to well-known modulator theory, the mixed signal output of the modulator fed to the IF filter 42 with a center freqency of 100 k.c. must contain a sum (or difference) signal frequency equal to 100 kc. Hence, it follows that the oscillator output signal frequency, with the capacitance network adjusted as above, equals 100 kc.$-f_1$, or 97,969 c.p.s. The mixed output signals will therefore include a "sum signal" (100 kc.$-f_1$)$+f_1$=100 kc.

Obviously, the same end result would obtain if the second input signal frequency for the modulator were (100 kc.$+f_1$); the pertinent signal frequency in the modulator output would then be the "difference signal" (100 kc.$+f_1$)$-f_1$, or 100 kc. As it is more convenient in the disclosed circuitry to decrease the oscillator frequency from 100 kc. by shunt capacitance bias, FIG. 2, the pertinent signal in the modulator output is the "sum signal" (100 kc.$-f_1$)$+f_1$.

A variable shunt capacitance for the further control of the oscillator also is provided by energizing the control grid of a reactor tube 46 by the voltage from a saw-tooth generator 47. This variable capacitance at reference r.p.m. simply causes the oscillator to sweep from 100 c.p.s, below its center frequency to 100 c.p.s. above it. At other than reference r.p.m., an additional bias, variable in sense and magnitude, is applied to the reactor tube, as presently described, for adjusting the oscillator center frequency to compensate for r.p.m. deviation.

The saw-tooth generator 47 also supplies a sweep voltage to the horizontal plates of the display CTR, the voltage for the vertical plates being supplied as indicated from the smoothing filter 44 in the data channel circuitry described above. The CRT display of the rectified 100 kc. signal from the IF filter 42 will be properly centered on the scope by the aforesaid capacitance circuitry at dial switch 36, assuming no deviation from the engine reference r.p.m. However, even a deviation of 1% from the reference r.p.m. produces a marked frequency shift from the center frequency of a given element, especially for the higher freqencies.

This frequency variation unless compensated presents a serious problem as a material shift of the CRT displayed signal moves it partly off the scope so as to be either misleading or unreadable.

For the purpose of r.p.m. tracking to keep each element frequency at the center of the scope so that accurate display intelligence is repeatable notwithstanding fluctuations of even ±1% in engine speed, control channel which includes the AFC unit provides a compensating D.C. bias voltage in addition to the aforesaid saw-tooth sweep voltage applied at the grid of the reactor tube 46. This added voltage causes the oscillator shunt capacitance to vary about a new center point so that the oscillator sweep is now symmetrical with respect to the discrete signal center frequency shown on the CTR scope.

Since, as above pointed out, the deviation frequency shift for a given element is proportional to its characteristic frequency, i.e., its particular r.p.m., the AFC must be capable of shifting the instant speed of the center frequency different amounts, depending on the element or part under test.

In the test set up shown, the A signal which includes the first stage compressor r.p.m. tracking signal frequency (2406 c.p.s.) is separately fed to the control channel amplifier 50, the output of which is fed to a band-pass filter 51 that has a center frequency (2406 c.p.s.). The filter accordingly passes within its band-width only the compressor center frequency with ±60 c.p.s. variation. The purpose of the filter is to select only a small portion of the over-all engine spectrum for tracking circuitry and thus maintain the highest signal-noise ratio possible. In practice, the compressor signal which is strong and represents directly engine r.p.m., can be advantageously used for r.p.m. tracking. However, it will be apparent that any other suitable signal from mike A or mike B, such as a turbine stage signal from mike B, can be used for r.p.m. tracking.

The filter signal is in turn fed to a transistorized single ended modulator 52 that also receives a signal from a local crystal-type oscillator 53 having a frequency of 400 c.p.s. higher than the center frequency of the control channel input filter 51, i.e., 2806 c.p.s. This modulator mixes the input and local oscillator signal frequencies, and the output contains these signal frequencies as well as the sum and difference frequencies. The mixer output signal is then fed to a low-pass filter 54 that passes only the difference frequency, i.e., the instant compressor signal frequency minus the oscillator signal frequency. Thus, for input frequencies varying within ±60 c.p.s. of the selected r.p.m. reference frequency, signals varying ±60 c.p.s. around 400 c.p.s. are produced.

Summarizing the control channel operation thus far, the signal passing through the input filter 51 contains the first stage compressor signal, as well as any random noise contained in a band width 60 c.p.s. either side of the filter center frequency. The mixer stage 52 does not remove any noise, but only changes its frequency. The effect of the noise is to degrade the wave shape of the first stage compressor signal and also vary its amplitude in random manner.

For obtaining a clean and uniform signal according to known practice, a stage of high-gain amplification is inserted followed by both positive and negative clipping. The clipper 55 greatly reduces the signal amplitude and produces a distinct square wave that is uniform in shape and amplitude. The square wave signal is now fed to a 400 c.p.s. discriminator 56 of the well-known pulse type. The first stage of the discriminator is a Schmitt trigger circuit to insure against triggering on small induced noise. The discriminator output is a train of equi-duration pulses whose spacing is inversely proportional to the input frequency. Operation is between −300 volts and ground which allows the pulses to vary between ground and −20 volts. This pulse train is in turn referenced to +12 volts through a potentiometer (zero adjust) which allows the average value of the pulse train to be adjusted to zero volts for exactly 400 c.p.s. An active (transistorized) low-pass filter at the final stage of the discriminator produces a D.C. voltage proportional to the average voltage of the pulse train. For frequencies below 400 c.p.s. (above the reference frequency), a positive voltage is produced and for frequencies above 400 c.p.s. (below the reference frequency), a negative voltage is produced. Discriminator circuitry of the character above is well known in the art and therefore is not shown in detail.

The output of the discriminator from the low-pass filter represents the AFC signal and is fed by lead 30, FIGS. 1 and 2, to a series-connected switch-potentiometer 37, which selectively provides for matching the span of the discriminator output to the analyser AFC requirements according to the test part frequency selected at dial SD.

The output of the frequency tracking unit at the discriminator 56 also controls a zero-centered deviation meter (r.p.m.) for indicating limits of ±1%, for example, with respect to the reference r.p.m.

Specifically, the switch-potentiometer 37 has a slider 37' for selective engagement with the selector contacts 1e, 2e, etc., that are connected to taps from the potentiometer resistance $R_2$. The resistance of sections between taps is proportioned according to the amount of shift required for the respective signal frequency of the element selected at dial SD. The resistance $R_2$ is connected at one terminal 58 to the AFC signal on lead 57, and at the opposite terminal 59 to ground through a proportioning resistance $R_3$. The slider 37' is connected by lead 60 to the input of the reactor tube 46, which also receives, as described above, the output of the saw-tooth generator 47 for introducing to the variable frequency oscillator 45 the D.C. compensating signal that is variable both as to sense and magnitude. That is, the D.C. signal is negative for engine speeds, say, between 46% and 47% r.p.m., and is positive for engine speeds between 47% and 48% r.p.m. The oscillator signal now adjusted according to the r.p.m. variation is fed to the balanced modulator in the data channel as previously described. The proper attenuation is applied to this signal at the potentiometer 37 for producing the proportional frequency shift at the VCO for centering the signal frequency as previously described, according to operation of the selector dial. Summarizing briefly, the VCO signal constitutes the output of the control channel which is mixed in the balanced modulator 41 with the attenuated mike "A" signals containing the discrete signal frequency of interest, $f_1$. The output of the modulator contains these signals, as well as certain sum and difference signals (100 kc.$-f_1$)$+f_1$, and (100 kc.$-f_1$)$-f_1$, respectively. Accordingly, the IF filter will pass only the modulated sum signal, which is a pure tone 100 kc. signal.

Although but a single r.p.m. reference point has been discussed, it will be apparent that the filter 51 may also include multiple filters for other reference points, depending on the discrete signal selected for r.p.m. tracking. These filters may be selectively connected in circuit by a reference frequency switch (not shown). For example, in addition to the center frequency filter for the 47% r.p.m. reference signal (2406 c.p.s.), filters for 85% (4350 c.p.s.) and 100% (5117 c.p.s.), respectively, may also be used where required. In such cases, the corresponding crystal-type local oscillators operate at the appropriate frequencies of 2806 c.p.s., 4750 c.p.s. and 5517 c.p.s., respectively, i.e., 400 c.p.s. higher than the corresponding center frequency, as previously described. Thus, but a single discriminator for 400±60 c.p.s. is required in the AFC circuitry.

Engine thrust indication at the meter "Thrust," FIG. 1, is effected by means of the C signal which represents the over-all sound pressure level. Here, the C signal is at low level and is therefore amplified at 62. The amplifier has adjustable gain and high negative feedback for improving the frequency response and ensuring stability. The amplified signal is fed through a calibration switch 63 and vacuum tube, voltmeter (VTVM) unit 64 which includes a rectifying network, the output of which energizes the thrust meter.

Since small variations in the sensitivity of the C mike, amplifier and VTVM circuitry would for practical purposes seriously impair the accuracy of thrust measurement, calibration means are provided for restoring accuracy. To this end, a calibration oscillator 65 is arranged to be connected through the switch 63 to the thrust circuitry, and to an acoustic calibrator 66. The oscillator is of the stabilized type for constant power output. The switch 63 has three positions, namely, a center position b for normal thrust measurement, position c for oscillator calibration wherein the meter is connected to the oscillator output, and position a for amplifier calibration. The oscillator is first calibrated by adjusting the oscillator output to exactly one volt RMS by meter indication. The switch is then set at a and the acoustic calibrator 66 is screwed into the mike C for direct acoustic coupling. Thus, the oscillator output is fed through the acoustic calibrator, mike C, amplifier 62, switch 63 and VTVM to the meter. The amplifier is then adjusted to conform with the now calibrated meter. This method also ensures pressure calibration of the mike system, as the acoustic calibrator and mike are matched commercially for acoustic coupling.

After calibration of the thrust system, mike C is relocated adjacent to the engine exhaust, switch 63 is set at the *b* position, and the system is in readiness for measuring thrust.

Checking of the analyser and AFC system, FIG. 2, can be accomplished by a stabilized crystal oscillator 69 through switches 67 and 68, respectively. The switch 67 connects the oscillator output to the input of analyser amplifier 40, and switch 68 connects it to the AFC meter (r.p.m.) circuit and hence to shift correction circuit of the analyser. This provides for checking of analyser drift, discriminator zero set, discriminator deviation and analyser sweep width.

Figure 3:
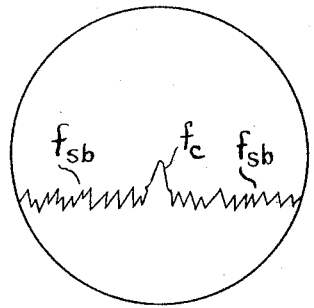
FIGS. 3 and 4 show, respectively, cathode ray tube oscillograms of selected characteristic signals from a gear train operating under normal and malfunction conditions, respectively.
Figure 4:
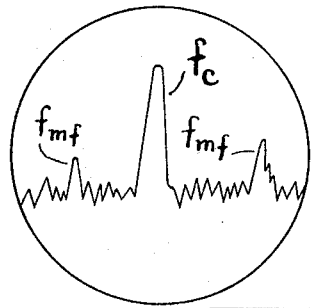

Representative CRT displays of typical normal and malfunction engine element conditions and effects of uncorrected r.p.m. shift are shown by FIGS. 3 to 9. In FIGS. 3 and 4 the oscillograms of the centered signals represent normal and malfunction conditions, respectively, for a gear train. It will be noted that in FIG. 4 a high peak malfunction signal appears at the center frequency, together with lesser flanking peak malfunction signals, as contrasted with the comparatively low amplitude of the center frequency and side band frequencies in FIG. 3 representing normal operation.

Figure 5:
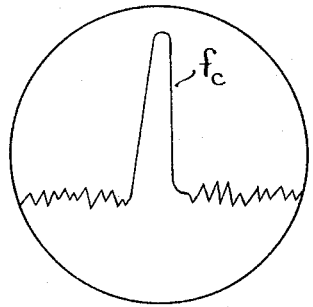
FIGS. 5 and 6 are oscillograms of selected characteristic signals from a turbine (or compressor) stage operating under normal and malfunction conditions, respectively.
Figure 6:
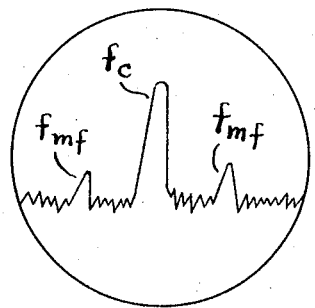

FIGS. 5 and 6 are oscillograms of centered signals representing normal and malfunction conditions, respectively, for either a turbine or compressor stage. For the normal condition, FIG. 5, there is but a single high peak for the center frequency with comparatively even, low amplitude side bands. Where malfunction is present, FIG. 6, the peaked center frequency is flanked on each side by a lesser peak that is conspicuously larger than the other side band peaks. The flanking peaks may indicate a damaged or missing blade, for example.

Figure 7:
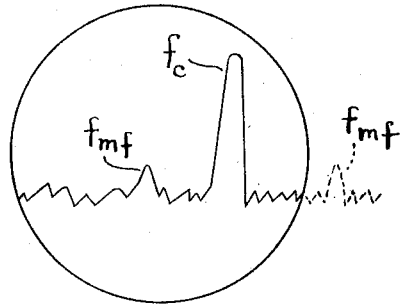
FIGS. 7 and 8 are oscillograms representing a signal for uncorrected and corrected frequency, respectively, from a given element where the element speed has deviated from a reference r.p.m.
Figure 8:
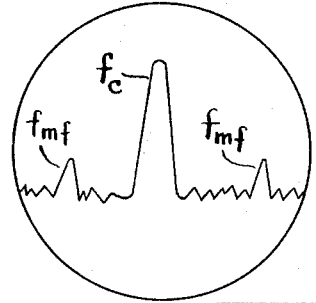
Figure 9:
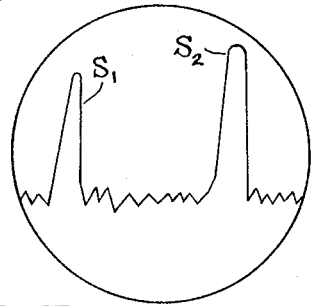
FIG. 9 is an oscillogram of two different signals from respective engine elements in the same spectral band.

FIGS. 7 and 8 illustrate the misleading character of an uncorrected frequency shift due to r.p.m. deviation. Uncorrected shift is shown by FIG. 7. Here, the center frequency might be confused with side band frequencies, and more important, informative side band peaks may be entirely off the scope as indicated. When the center frequency is shifted to the middle of the scope, FIG. 8, the complete information for the element in question is shown for proper evaluation.

Where the center frequencies of two engine elements are in the same band width, it is practical to show the center frequency peaks of each on the same scope as in FIG. 9. In this case, the shift correction need be applied the correct amount to but one signal, since the other is in the same band.

Although a limited number of representative engine element signals are referred to herein, any practical number of signals may obviously be analysed according to the present invention. For example, a main bearing signal for normal operation is practically nil. Bearing malfunction may occur as previously indicated in several ways (race and/or ball damage, etc.) so that several center frequencies for the significant components of the bearing may require analysing before malfunction is indicated.

Where subsequent analysis data for review evaluation is required, the A, B and C signals may be recorded as indicated in FIG. 1 for checking malfunction along with comparative thrust measurements. This comparison may be significant where for example a compressor malfunction is indicated. The compressor controls oxygen input, of which thrust is a function. Also, if desired, a two-display CRT scope may be used, one display being that of a current test and the other adjacent display being produced by stored information representing the normal operating condition of the element under test, thereby facilitating more ready comparison and evaluation.

For purposes of simplicity, the basic A.C. power supply including voltage regulation has been omitted from the disclosure, it being apparent that any acceptable supply and regulation system can be used for supplying voltage to the circuitry of the invention.

It should be understood that this invention is not limited to specific details of construction and arrangement thereof herein illustrated, and that changes and modifications may occur to one skilled in the art without departing from the spirit of the invention.

What we claim is:

1. An engine sonic analyser system for detecting mechanical faults in rotating parts of a high-speed engine running at or near a predetermined reference r.p.m., comprising acoustical means positioned in air-spaced, separately mounted relation to the engine for producing electrical signals representing sound spectrum energy radiated from one or more selected regions of the engine, said spectrum signals including an electrical reference signal of frequency that is characteristic of a given engine part rotating in direct relation to the engine r.p.m. and a discrete signal of frequency that is characteristic of an engine part selected for test, and electronic analysing means having no mechanical or electrical connection with the engine, for receiving all the aforesaid sound spectrum signals and producing information for representing the actual operative condition of the selected test part as compared with known data on a normal counterpart, said analysing means constituting electronic circuitry defining a data signal channel and a control signal channel for processing the sound spectrum signals, the data channel including a balanced modulator having a first input for the sound spectrum signals, the control channel constituting electronic circuitry interconnecting through a separate branch said acoustical means and a second input of said balanced modulator and having means for producing from the sound spectrum signals, including said signal representing actual r.p.m. of the engine, a tracking signal corrected for deviation of engine r.p.m. from the reference r.p.m. said tracking signal being fed to said second input of the balanced modulator for mixing with said first input spectrum signals, and an intermediate-frequency filter for selecting from the modulated balanced modulator signal output of the mixer a pure tone signal representing the discrete test signal corrected for r.p.m. deviation, and a display indicator responsive to said pure tone signal for visual manifestation of the operative condition of the selected test part as compared with a normal counterpart.

2. An engine sonic analyser system as specified in claim 1, wherein the output of the balanced modulator includes a modulated signal that is amplitude-related to that of the discrete signal and of frequency corresponding to that of the center-frequency of the intermediate-frequency filter, said filter passing only said modulated signal for representing the discrete test signal of interest corrected for r.p.m. deviation.

3. An engine sonic analyser system as specified in claim 2, wherein the output of a high frequency oscillator is fed to the second input of the modulator, the oscillator output being of frequency comparable to that of the fixed center-frequency of the intermediate-frequency filter.

4. An engine sonic analyser system as specified in claim 2, wherein the display indicator is a cathode ray tube.

5. An engine sonic analyser system as specified in claim 1, wherein the acoustical means consists of at least one sensitive non-directional microphone and the spectrum signals therefrom are fed to attenuating and variable gain amplifying means prior to input at the balanced modulator in the data channel, for adjusting individually the signal level of the selected discrete signal to the level desired at said display indicator.

6. An engine sonic analyser system as specified in claim 1, wherein the control channel includes a band-pass filter of center-frequency corresponding to that of the r.p.m. signal at engine reference r.p.m. and local reference oscillator for comparing the signal from the band-pass filter with a fixed reference frequency signal, and discriminator means responsive to the compared local oscillator output for producing an error signal representing deviation of engine r.p.m. from the reference speed.

7. An engine sonic analyser system as specified in claim 6, wherein the deviation error signal is a D.C. voltage for determining the control channel signal at the second input of the balanced modulator, and a meter representing r.p.m. variation from reference r.p.m. is responsive to said D.C. voltage.

8. An engine sonic analyser system as specified in claim 1, wherein selector means are manually operable according to the numerical relation between the discrete signal frequency and the signal frequency representing engine r.p.m. for adjusting the signal that is fed to the second input of said balanced modulator.

9. An engine sonic analyser system for detecting mechanical faults in rotating parts of a high-speed engine that is set for running at a predetermined reference r.p.m., the engine according to its control characteristics being subject to minor deviations in speed from said reference r.p.m., comprising acoustical means positioned in air-spaced, separate relation to the engine for producing in response to radiated acoustical energy from the engine electrical signals representing the sound spectrum from one or more selected regions of the engine, said spectrum including an engine r.p.m. reference signal of frequency that is characteristic of a given part rotating at a speed representing the engine r.p.m. and a discrete signal of frequency that is characteristic of an engine part selected for test, and electronic analysing means for receiving all the aforesaid sound spectrum signals and displaying information visually indicating the actual operative condition of the selected test part as compared with known data on a normal counterpart, said analysing means constituting electronic circuitry defining a data signal channel and a control signal channel for processing the sound spectrum signals, the data channel having a balanced modulator, one input of which constitutes sound spectrum signals from said acoustical means, the control channel separately receiving sound spectrum signals from the acoustical means and having a band-pass filter of center-frequency corresponding to that of the aforesaid r.p.m. reference signal, electronic signal comparing and discriminating means in said control channel circuitry receiving the band-pass filter output for producing a control signal having a high-frequency component corrected for reference r.p.m., said corrected signal constituting another input for said balanced modulator, an intermediate-frequency narrow-band filter having a fixed center-frequency for selecting from the mixed signal output of said modulator a high-frequency pure tone signal representing the discrete test signal corrected for engine r.p.m. deviation, and a display indicator responsive to the corrected signal for visually representing the operative condition of the selected test part as compared with that of a normal counterpart.

10. An engine sonic analyser system for detecting mechanical faults in rotating parts of a high-speed engine running at or near a predetermined reference r.p.m., comprising acoustical means positioned in air-spaced, separately mounted relation to the engine for producing electrical signals representing sound spectrum energy radiated from one or more selected regions of the engine, said spectrum signals including an electrical reference signal of frequency that is characteristic of a given engine part rotating in direct relation to the engine r.p.m. and a discrete signal of frequency that is characteristic of an engine part selected for test, and electronic analysing means having no mechanical or electrical connection with the engine, for receiving all the aforesaid sound spectrum signals and producing information for representing the actual operative condition of the selected test part, as compared with known data on a normal counterpart, said analysing means constituting electronic circuitry defining a data signal channel and a control signal channel for processing the sound spectrum signals, the data channel including a signal mixer having a first input for the sound spectrum signals, the control channel constituting electronic circuitry interconnecting through a separate branch, said acoustical means and a second input of said mixer and having means for producing from the sound spectrum signals of the acoustical means, including the signal representing actual r.p.m. of the engine, a corrected tracking signal, said control channel circuitry having comparing and discriminating means for producing from the sound spectrum signals of the acoustical means an r.p.m. error signal that is variable according to the deviation of engine r.p.m. from the reference r.p.m. and that determines the corrected tracking signal, said tracking signal being fed to said second input of the mixer for mixing with said first input spectrum signals, and an intermediate-frequency filter for selecting from the modulated mixed signal output of the mixer a pure tone signal representing the discrete test signal corrected for r.p.m. deviation, and a display indicator responsive to said pure tone signal for visual manifestation of the operative condition of the selected test part, as compared with a normal counterpart.

References Cited by the Examiner
UNITED STATES PATENTS

| | | | |
|---|---|---|---|
| 3,070,995 | 1/1963 | Broder et al. | 73—116 X |
| 3,107,525 | 10/1963 | Murray | 73—116 |

RICHARD C. QUEISSER, *Primary Examiner.*

J. W. MYRACLE, *Assistant Examiner.*